(12) United States Patent
 Kobayashi et al.

(10) Patent No.: US 11,945,581 B2
(45) Date of Patent: Apr. 2, 2024

(54) DRONE BACKPACK SYSTEMS

(71) Applicants: Leo Kobayashi, Warwick, RI (US);
 Derek L. Merck, Gainesville, FL (US)

(72) Inventors: Leo Kobayashi, Warwick, RI (US);
 Derek L. Merck, Gainesville, FL (US)

( * ) Notice: Subject to any disclaimer, the term of this patent is extended or adjusted under 35 U.S.C. 154(b) by 381 days.

(21) Appl. No.: 17/175,200

(22) Filed: Feb. 12, 2021

(65) Prior Publication Data
 US 2021/0245878 A1   Aug. 12, 2021

Related U.S. Application Data

(60) Provisional application No. 62/975,527, filed on Feb. 12, 2020.

(51) Int. Cl.
 *B64C 39/02* (2023.01)
 *H04N 21/2187* (2011.01)
 *B64U 101/30* (2023.01)

(52) U.S. Cl.
 CPC ....... *B64C 39/024* (2013.01); *H04N 21/2187* (2013.01); *B64U 2101/30* (2023.01); *B64U 2201/20* (2023.01)

(58) Field of Classification Search
 CPC .............. B64C 39/024; H04N 21/2187; B64U 2201/20; B64U 2101/30
 See application file for complete search history.

(56) References Cited

U.S. PATENT DOCUMENTS

| | | | |
|---|---|---|---|
| 11,235,890 B1* | 2/2022 | Dahlstrom | B05C 11/1005 |
| 2012/0136415 A1* | 5/2012 | Faraji | G01N 29/00 220/660 |
| 2018/0203119 A1* | 7/2018 | Kern | G01B 21/042 |
| 2020/0093014 A1* | 3/2020 | Merenda | H04M 1/72412 |

* cited by examiner

*Primary Examiner* — Peter D Nolan
*Assistant Examiner* — Roy Rhee
(74) *Attorney, Agent, or Firm* — Cozen O'Connor (57) ABSTRACT

A drone backpack includes a housing with a harness that attaches to a main body of a drone without modification of the drone. A boom couples with the harness to position a display module in a field of view of a forward-facing camera of the drone. A compute component is located within the housing and includes at least one processor and memory storing machine-readable instructions that are executable by the processor to output information on a screen of the display module. The information is captured by the forward-facing camera of the drone and included in a live video feed transmitted from the drone. The backpack may also include an effector, controllable via the compute component sensing a light status of the drone, and one or more sensors. The backpack augments the drone to enable one or more of a combat game, aerial labelling, low-cost one-time use, and STE(A)M.

12 Claims, 8 Drawing Sheets

DRONE BACKPACK SYSTEMS

RELATED APPLICATION

This application claims priority to U.S. Provisional Patent Application Ser. No. 62/975,527, titled "Drone Backpack Systems," filed Feb. 12, 2020, and incorporated herein by reference in its entirety.

BACKGROUND

Generic drones have become ubiquitous and cheap, but these cheap generic drones have limited functionality. Specialized drones have a high cost.

SUMMARY

Drones (e.g., quadcopter, hexacopter, octocopter, etc.) are ubiquitous, and typically have a video camera (e.g., forward facing) and lights (e.g., navigations lights). These drones are controlled wirelessly from a remote controller that may include a display showing a live feed from the video camera. Alternatively, the live feed from the video camera may be displayed on other apparatus, such as a smartphone, a tablet, goggles, and so on. One aspect of the present embodiments includes the realization that functionality of these drones is limited to flight and image capture. The present embodiments solve this problem by attaching (e.g., using a harness that is sized and shaped to couple with the main body of the drone) a backpack to the standard drone to add functionality and increase usability. Advantageously, the drone backpack adds functionality to a standard configuration drone, thereby alleviating the need for expensive custom configuration drones. Further, by switching between different backpacks, the same drone may be used for many different functions.

In certain embodiments, a drone backpack is for a drone having a forward-facing camera. The drone backpack includes a housing, a harness that mechanically couples the housing with a main body of the drone, a display module having a screen, a boom coupled with the harness at a first end and coupled with the display module at a second end, the boom being aligned with the main body of the drone to position the screen within a field of view of the forward-facing camera, and a compute component located within the housing and communicatively coupled with the display module to output information on the screen.

In another embodiment, a drone backpack for a drone having a forward-facing camera includes a housing, a harness that mechanically couples the housing with a main body of the drone without modification of the drone, a display module with a screen, a boom coupled with the harness at a first end and coupled with the display module at a second end, the boom being aligned with the main body of the drone to position the screen within a field of view of the forward-facing camera. The drone backpack also includes a compute component located within the housing and communicatively coupled with the display module to output information on the screen, and at least one sensor for sensing conditions about the drone.

In another embodiment, a drone backpack kit for a drone having a forward-facing camera, includes a housing, a harness for mechanically coupling the housing with a main body of the drone, a display module having a screen, a boom coupled with the harness at a first end and coupled with the display module at a distal end, the boom being aligned with the main body of the drone to position the screen within a field of view of the forward-facing camera, and a compute component located within the housing and communicatively coupled with the display module to output information on the screen. The drone backpack kit also includes at least one breadboard for receiving components to implement functionality within the backpack kit.

DETAILED DESCRIPTION OF THE EMBODIMENTS

Figure 1:
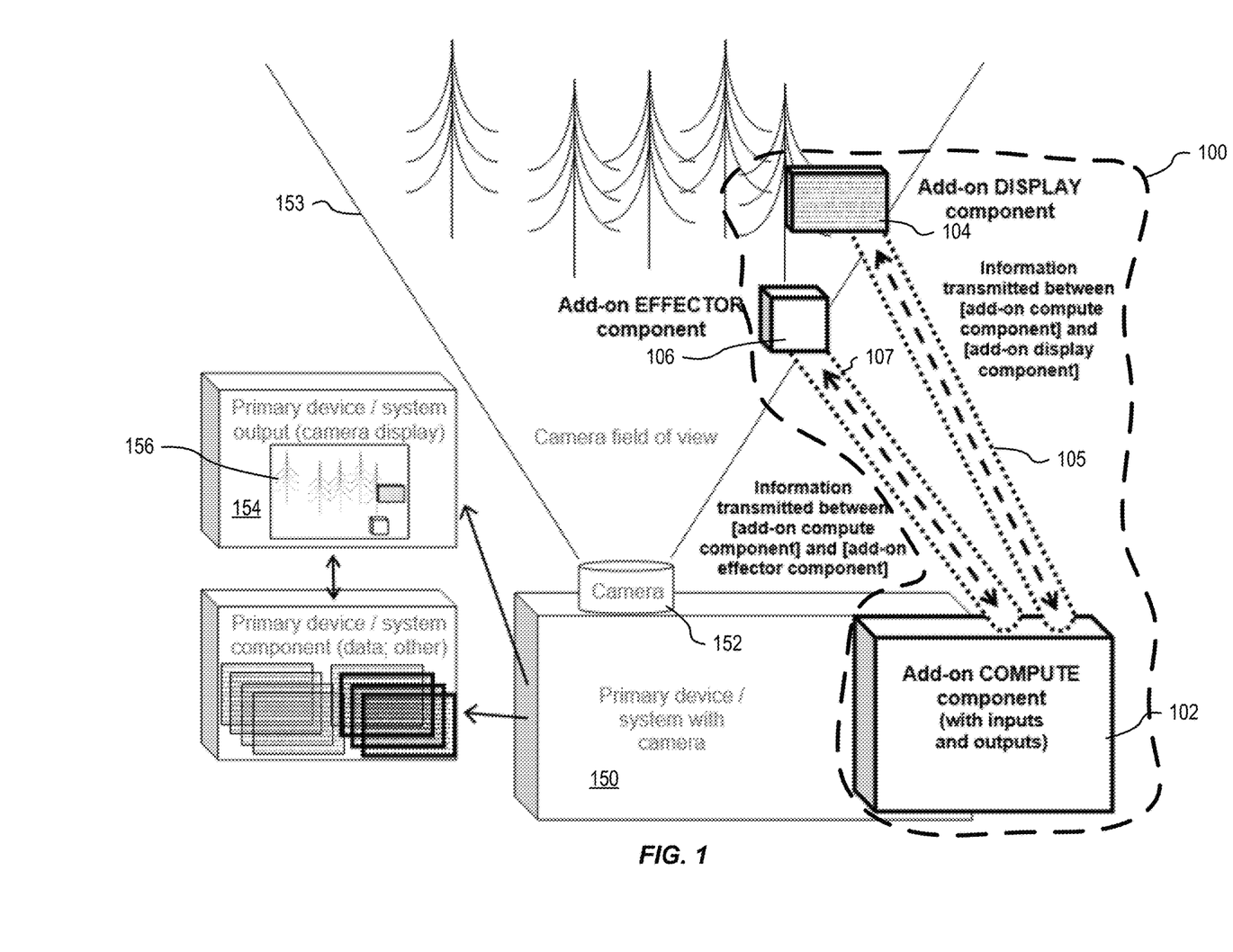
FIG. 1 is a block diagram illustrating example components of a drone backpack attached to a drone, in embodiments.

FIG. 1 is a block diagram illustrating components included in a drone backpack 100 attached to a drone 150. Drone 150 may represent any type of drone that includes a video camera 152 for use with a remote controller 154 and a display 156 that shows a live feed from video camera 152. Drone backpack 100 includes a self-contained add-on compute component 102, a display module 104, and a controllable effector 106. Drone backpack 100 is light weight, attaches to an airframe of drone 150, and is easily carried by drone 150 in flight. Compute component 102 may include one or more of a microcontroller, processor and memory, electronic circuitry, and other functionality specific components. In one example, compute component 102 includes an Adafruit Feather m4 microcontroller circuit that includes an Arm Cortex-M4 processor with non-volatile memory and Random-Access memory (RAM). Compute component 102 may include software (e.g., one or more algorithms implemented as machine readable instructions stored in the memory) that when executed by the processor, control the processor to cause compute component 102 to have the functionality described herein.

Drone backpack 100 includes a boom 105, supported by a harness (see harness 703 of FIG. 7) of drone backpack 100. Boom 105 positions display module 104 in a field-of-view 153 of video camera 152 such that output from display module 104 is included in a video feed transmitted from drone 150 and output on display 156 of controller 154. Display module 104 is driven by compute component 102 and thereby allows compute component 102 to provide feedback to a person using controller 154. Advantageously, compute component 102 is able to send information to the person operating the drone without requiring drone 150 or backpack 100 to be fitted with additional wireless transmitters, and without requiring additional receivers to receive the information. A significant weight saving (e.g., between a few ounces to a pound or more, depending on the wireless spectrum used and a range of transmission, etc.) is achieved by not including the additional wireless transmitter and associated antenna in drone backpack 100. That is, through use of display module 104 positioned within a field of view of video camera 152, backpack 100 uses the existing video feed from drone 150 to convey information to the person operating drone 150, or to other observers of the video feed.

In certain embodiments, drone backpack 100 includes a second boom 107 supported by the harness to position effector 106 within field-of-view 153 of video camera 152. Accordingly, effector 106 is also included in the video feed transmitted from drone 150 and is also visible on display 156. Advantageously, by including images of effector 106 in the live video feed from drone 150, the person controlling drone 150 is aided in positioning effector 106 through control of drone 150. In other embodiments, second boom 107 is not included and effector 106 mechanically couples directly with the harness of drone backpack 100 and/or may attach to a main body, landing gear, and/or an arm of drone 150.

Where drone 150 includes lights (e.g., navigation lights) controllable from controller 154, compute component 102 may include one or more sensors to detect a status of the lights (e.g., on/off) as an input. In certain embodiments, compute component 102 interprets this input to control (wired, wirelessly, and/or mechanically) effector 106. For example, the person controlling drone 150 may activate and deactivate the lights on the drone to control effector 106. In other embodiments, compute component 102 may interpret this input to control other functionality of drone backpack 100. Advantageously, by using controller 154 to control lights of drone 150, and by viewing display 156 that shows live video feed from drone 150 that includes output from display module 106, the person controlling drone 150 may interact with compute component 102 of drone backpack 100, for example to control effector 106 and/or other functionality of backpack 100.

In certain embodiments, the harness of backpack 100 is attachable to many different drone models. In other embodiments, the harness of backpack 100 is custom designed to attach to a particular drone model. However, backpack 100 attaches to drone 150 without requiring any structural changes, and drone 150 is unmodified when backpack 100 is removed therefrom.

The following embodiments provide four example-use cases for drone backpack 100: an aerial drone combat game, an aerial labeling apparatus, a (single use) radiation dosimetry apparatus, and a STE(A)M kit. Embodiments disclosed herein are representative and are not intended to limit scope of backpack 100 in any way.

Combat Game Drone Backpack

Figure 2:
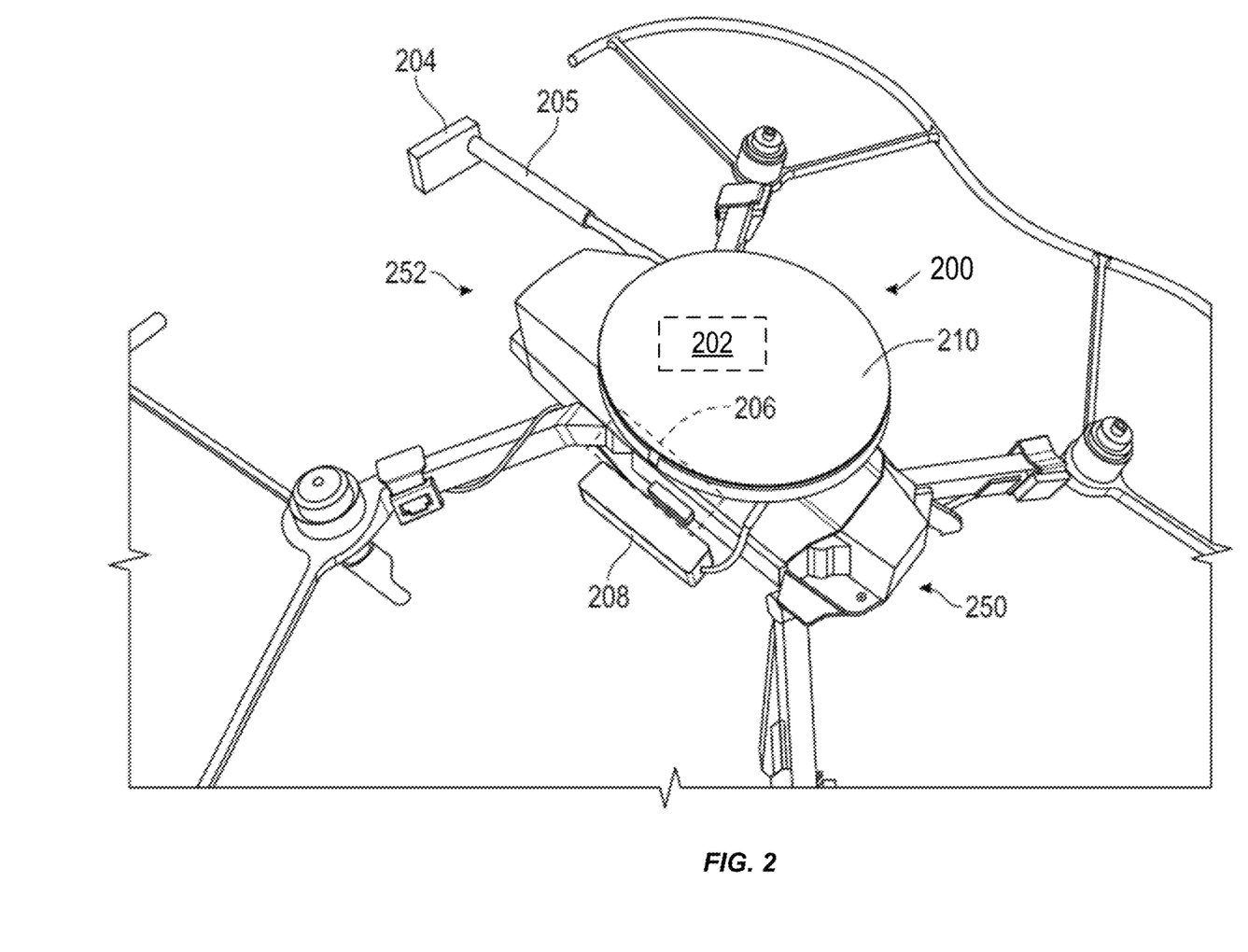
FIG. 2 is a side perspective view of a combat game drone backpack attached to a drone with a video camera, in embodiments.
Figure 3:
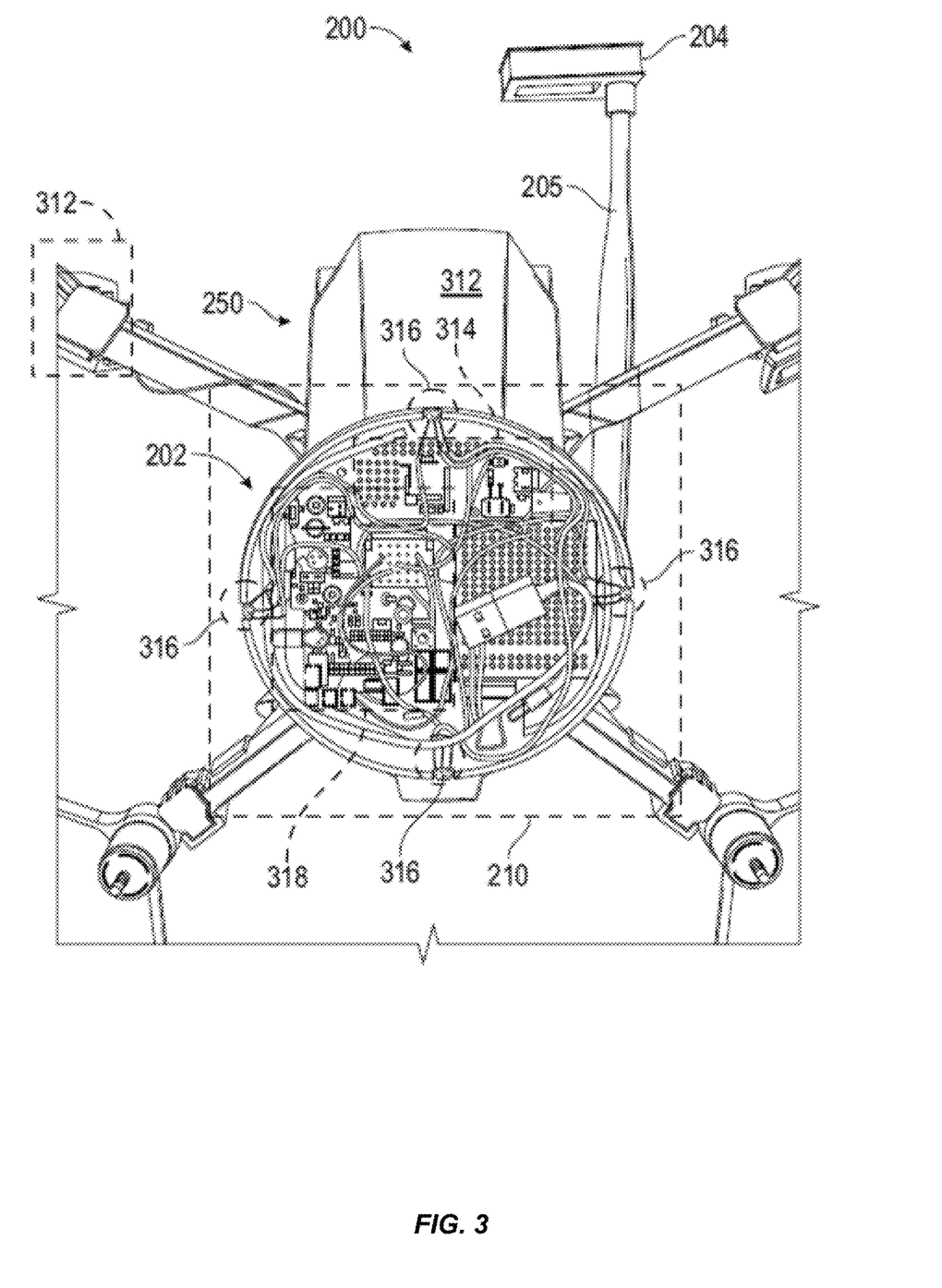
FIG. 3 is top view of the combat game drone backpack of FIG. 2 attached to the drone, with the top of the housing removed to show internal circuitry of the compute component, in embodiments.
Figure 4:
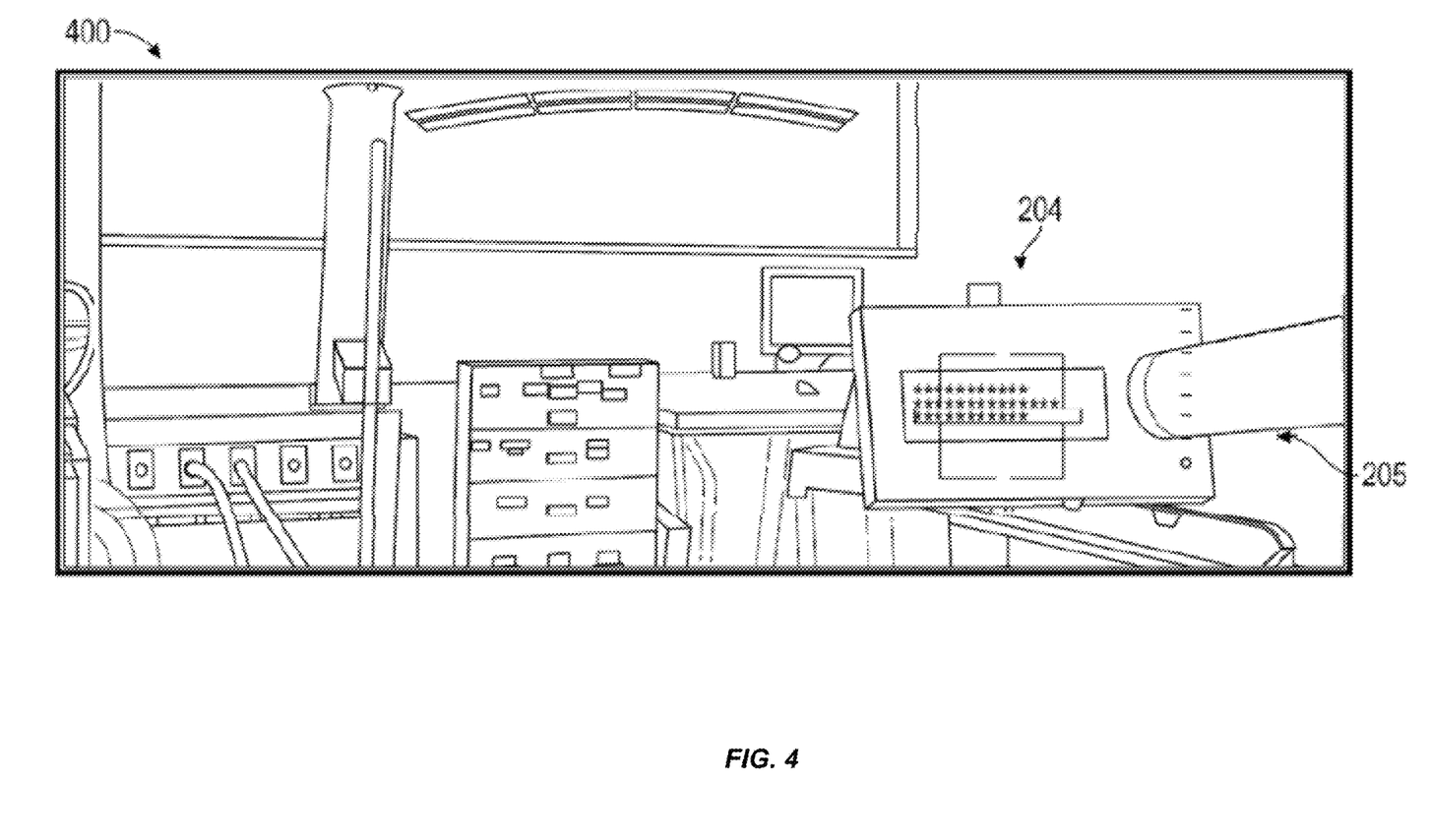
FIG. 4 shows one example video frame captured by the video camera of the drone of FIGS. 2 and 3, in embodiments.

FIG. 2 is a side perspective view of a combat game drone backpack 200 attached to a drone 250 with a video camera 252. FIG. 3 is top view of combat game drone backpack 200 of FIG. 2 attached to drone 250, with the top of housing 210 removed to show internal circuitry of compute component 202. FIG. 4 shows one example video frame 400 takes from a live video feed captured by video camera 252 of drone 250. FIGS. 2, 3, and 4 are best viewed together with the following description. In this example, drone 250 is a commercially sold drone, such as the DJI Mavic Pro gen 1, however, other similar drones may be used without departing from the scope hereof.

Drone backpack 200 is similar to drone backpack 100 of FIG. 1, and includes a compute component 202 (within a housing 210), a display module 204 positioned by a boom 205 within a FOV of video camera 252 of drone 250, an infrared blaster 206 (an implementation of effector 106), and a battery pack 208 for powering components of drone backpack 200. Compute component 202 includes at least one processor and memory (e.g., an AdaFruit Feather m4) storing software (e.g., one or more algorithms implemented as machine readable instructions stored in the memory) that when executed by the processor, controls the processor to cause compute component 202 to implement the functionality described herein.

In certain embodiments, display module 204 has an array of 128×32 pixels and may display encoded information that includes alphanumeric characters and/or graphics; however, display 204 may be of other dimensions and capability without departing from the scope hereof. Drone backpack 200 further includes a light sensor 312 positioned to sense light emitted by a light (e.g., navigation light) of drone 250 and provide an input to compute device 202 that indicated a status of the drone light (e.g., indicating when the drone light is activated (on) or deactivated (off). In certain embodiments, light sensor 312 is a photoresistor located within housing 310 and optically coupled with a fiberoptic cable positioned by a silicone rubber drone leg attachment to channel light from the drone light to the photoresistor, which is electrically coupled to provide an input signal to an input of the processor of compute component 202. Compute component 202 uses this input signal to control IR blaster 206, which generates a beam of IR light when activated.

Drone backpack 200 also includes a plurality of IR sensors 316 positioned around the outside of housing 210 to detect IR light emitted by an IR blaster (e.g., IR blaster 206) of another drone backpack 200 during aerial combat. IR sensors 316 provide an input signal to the at least one processor of compute component 202 indicating when drone 250 is "hit" by IR light from IR blasters 206 of other drone backpacks 200. Compute component 202 may output in-game information (e.g., munitions left, airframe damage from "hits", etc.) to display module 204, which may be viewed by the person operating drone 250 (e.g., on display 156 of controller 154, or on goggles, etc.). In certain embodiments, housing 210 may also include at least one light output device (e.g., LED) that is flashed by compute component 202 when IR sensors 316 detect a "hit." As shown in video frame 400, the software of compute component 202 controls display module 204, positioned by boom 205, to display game information calculated by compute component 202 based upon operation of drone 250 and effects (e.g., hits) from backpacks mounted to other drones.

Advantageously, combat game backpack 200 enhances any standard configuration drone (e.g., drone 250) for playing interactive combat games (e.g., with other such equipped drones) without requiring the user to purchase a special drone configured only for playing the combat games.

Figure 5:
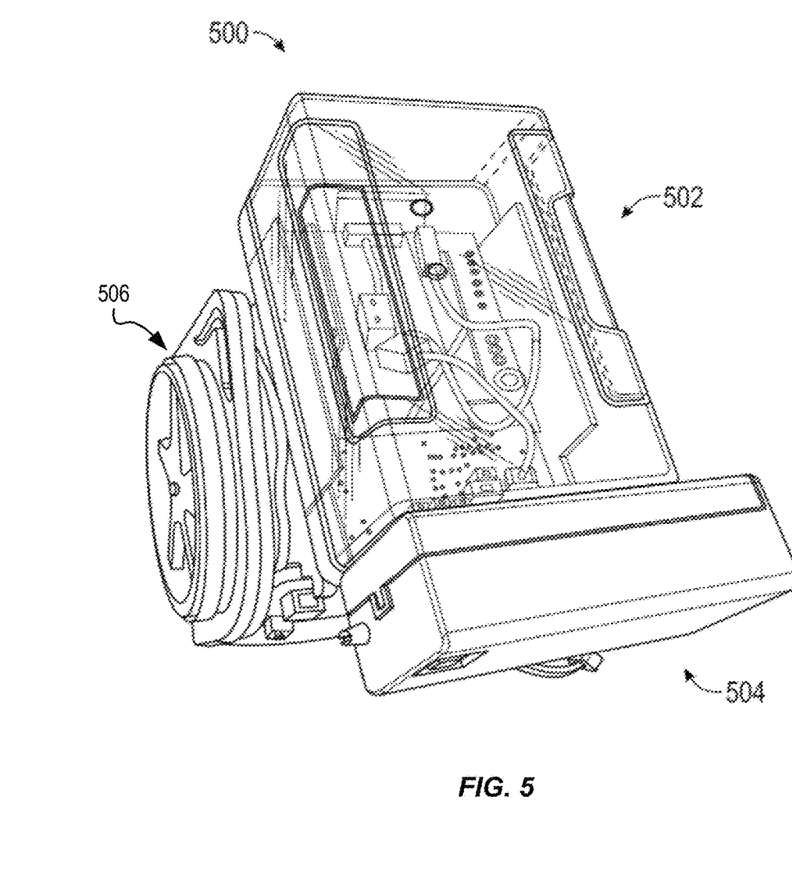
FIGS. 5 and 6 shows one example IR sensor equipped target device for use with the drone backpack of FIGS. 2 and 3, in embodiments.
Figure 6:
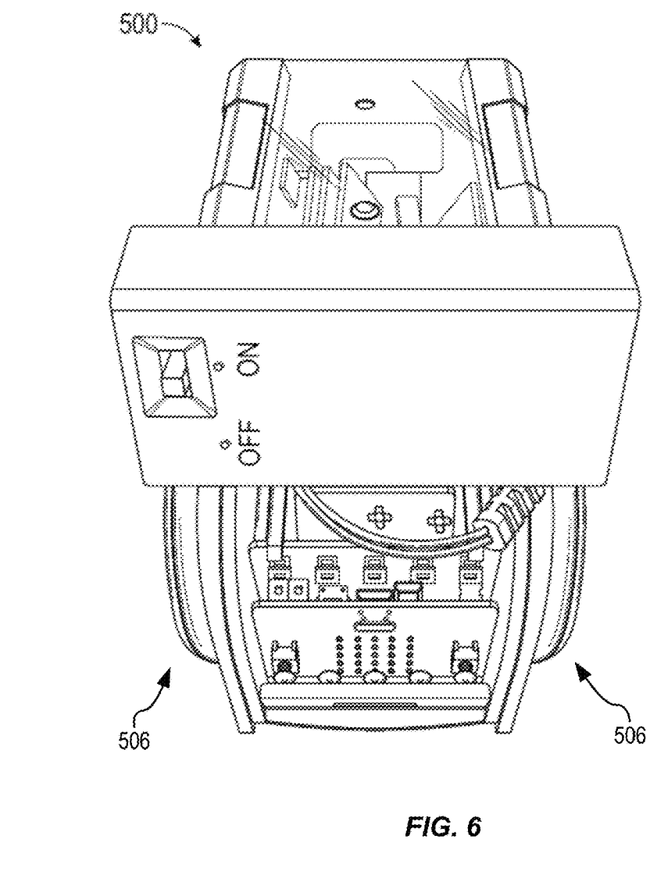

FIGS. 5 and 6 shows one example IR sensor equipped target device 500 for use with drone backpack 200 of FIGS. 2 and 3. In certain embodiments, target device 500 is a robotic device that includes a housing 502, batteries 504, wheels 506, and at least one servo motor, at least one processor, memory, an IR sensor electrically coupled with the processor, and a speaker. Target device 500 includes software (e.g., algorithms implemented as machine readable instructions stored in memory), that when executed by the processor control target device 500 as described herein. In certain embodiments, target device 500 is implemented using Kitronik's Move mini buggy kit, a MicroBit controller, and an Adafruit Feather m4. The MicroBit controller and the Feather M4 processor are located within housing 502 and either operate independently, or cooperate, to control operation of target device 500, wherein the MicroBit controller controls movement of target device 500 and the feather M4 processor senses and responds to IR signals received from IR blaster 206 of backpack 200.

Target device 500 serves as a mobile, self-propelled, pre-programmed object to be targeted by backpack 200 attached to a drone. Target device 500 may determine (e.g., using the IR sensor) when it is 'hit' by infrared blaster 206 of backpack 200, and may indicate the hit by flashing one or more LED light(s) and may announce the hit using the on-board speaker. In certain embodiments, target device 500 transmits information (e.g., number(s), time(s), location(s), etc.) of damage it has sustained to backpack 200 (e.g., one or more combat game players) and/or game referees as part of a competition. In certain embodiments, target device 500 also includes an IR blaster (e.g., similar to IR blaster 206) that is automatically controlled by the software to variably inflict damage (e.g., when the IR beam emitted from target device 500 is detected by) to backpack 200 on the combat game drone, for example, based upon one or more of range, angle, and duration of backpack 200 to target device 500. In certain embodiments, a plurality of target devices 500 may communicate to coordinate attacks on one or more combat game drones (e.g., on backpack 200) and/or cooperate to evade attacks from the combat game drone (e.g., from backpack 200). That is, the software and algorithms within target device 500 cause target device 500 to operate with intelligence that increases difficulty of the drone combat game.

Aerial Labelling Drone Backpack

Figure 7:
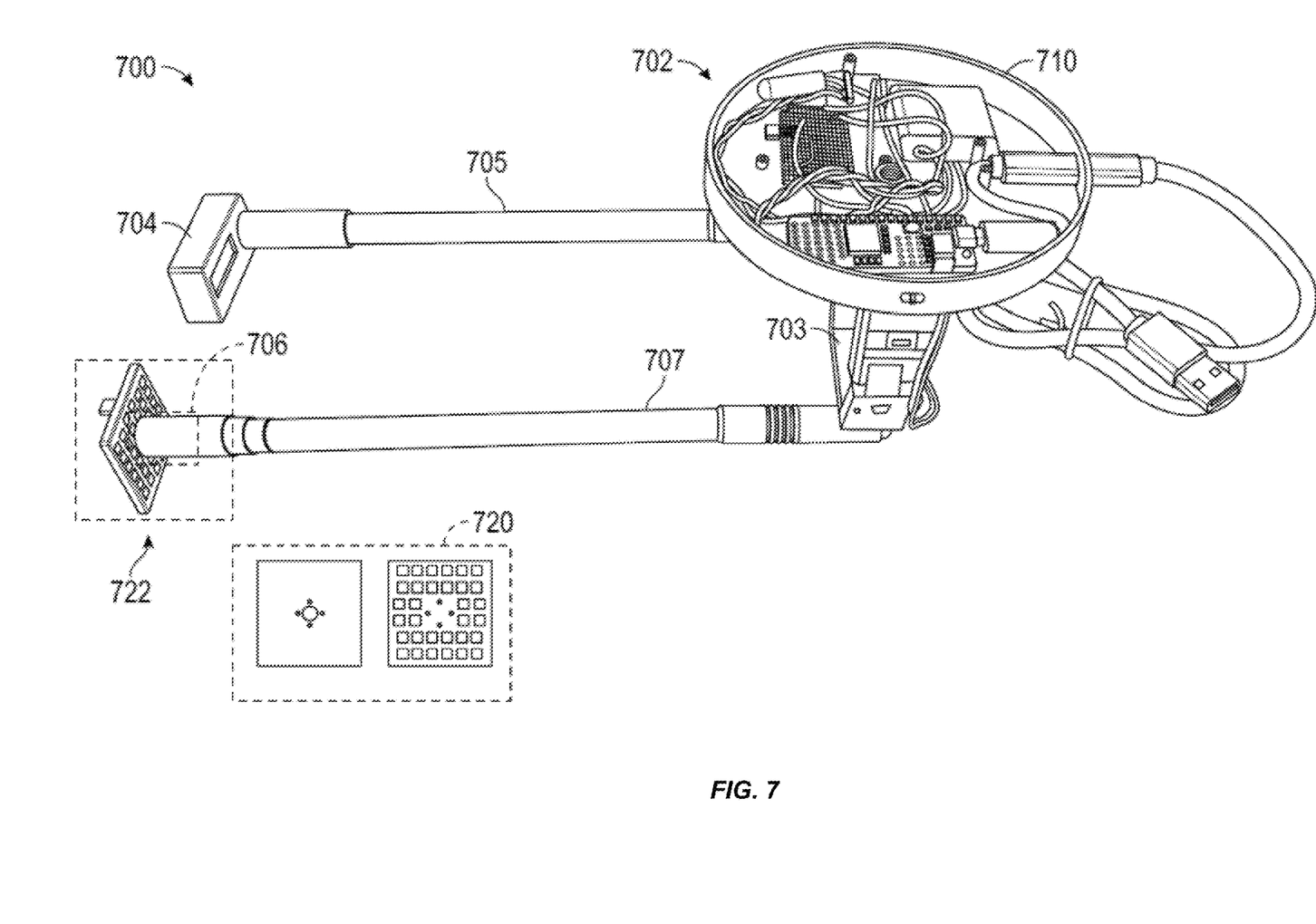
FIG. 7 is a side perspective view of an aerial labelling drone backpack for attaching labels at high, hard to reach, surfaces, in embodiments.

FIG. 7 is a side perspective view of an aerial labelling drone backpack 700 for attaching a tag 720 (e.g., a label, a wireless tag, a wireless beacon, a marker, or any other similar component) at high, hard to reach, surfaces (e.g., power line/tower equipment, bridges, building, structures, etc.). Drone backpack 700 is similar to drone backpack 100 of FIG. 1, and includes a compute component 702 (within a housing 710), a display module 704 positioned, by a first boom 705, within a FOV of a video camera of a drone when backpack 700 is attached thereto, a UV light emitter 706 (an implementation of effector 106) positioned at a distal end 722 of a second boom 707, which positions distal end 722 within the FOV of the drone's video camera. Housing 710 and booms 705, 707 mechanically attach to a harness 703 that mechanically couples with a drone (not shown). In the example of FIG. 7, harness 703 is shaped and sized to couple with a body of a drone. In certain embodiments, harness 703 may be implemented as a strap the passes around at least part of a body of the drone. A top of housing 710 is removed to show internal circuitry of compute component 702. Compute component 702 includes at least one processor and memory (e.g., an AdaFruit Feather m4) storing software (e.g., one or more algorithms implemented as machine readable instructions stored in the memory) that when executed by the processor, controls the processor to cause compute component 702 to implement the functionality described herein.

FIG. 7 also shows a front side and a back side of two example 3D-printed tags 720 that releasably couple, using friction, with the distal end of second boom 707. UV-curing glue is placed in the dimple recesses on one side of tag 720 and the other side is frictionally coupled with distal end 722. Activation of the drone light is detected by computer component 702 (e.g., using a sensor as described above for backpack 100, FIG. 1), which causes compute component 702 to activate UV light emitter 706 to cure the UV-curing glue.

In one example of operation, aerial labelling drone backpack 700 is attached to a drone (e.g., drone 150/250) using harness 703. UV-curing glue is applied within dimples of tag 720, and tag 720 is attached to distal end 722 of boom 707. A person (e.g., a drone pilot) controls the drone to position tag 720 at a receiving surface, and then activates a controllable light (e.g., navigation light) of the drone. Compute component 702 detects the activation of the light, and in response, activates UV light emitter 706 (e.g., for a pre-defined curing period or until computer component 702 detects that the light has been deactivated). UV light emitter 706 emits UV light that cures the UV-curing glue and adheres tag 720 to the receiving surface. Once the UV-curing glue is cured, the person may control the drone to move away from the receiving surface, overcoming the friction retaining the tag at distal end 722 of boom 707, such that tag 720 remains attached to the surface. Advantageously, aerial labelling drone backpack 700 allows a generic drone to be used to attach tag 720 at a hard to reach surface without requiring ladders, or other such equipment for enabling a person access to the receiving surface.

Single-Use/Disposable Drone and Backpack

In certain circumstances, a drone may only be used once (single use), after which it may be disposed of, or lost, depending on the circumstance or specific use. For example, when operating the drone at a limit of its operational range and/or endurance, the drone would run out of power and be unable to return to a retrievable location. In another example, where the environment (expected drone operating area) is dangerous, contaminated, or contested (e.g., when detecting level of leaking radiation at a nuclear accident), the drone and sensors may become contaminated and would be disposed of after use. In another example, the drone may be used in an environment that is high risk of damage for the drone. For such applications the equipment (e.g., drone and sensors) becomes single-use and/or disposable, and it is therefore desirable to minimize cost of the equipment. Advantageously, by including sensors in a drone backpack that attaches to a standard configuration drone, the equipment cost is reduced since it is unnecessary to purchase an expensive high specification drone with built-in sensors.

Figure 8:
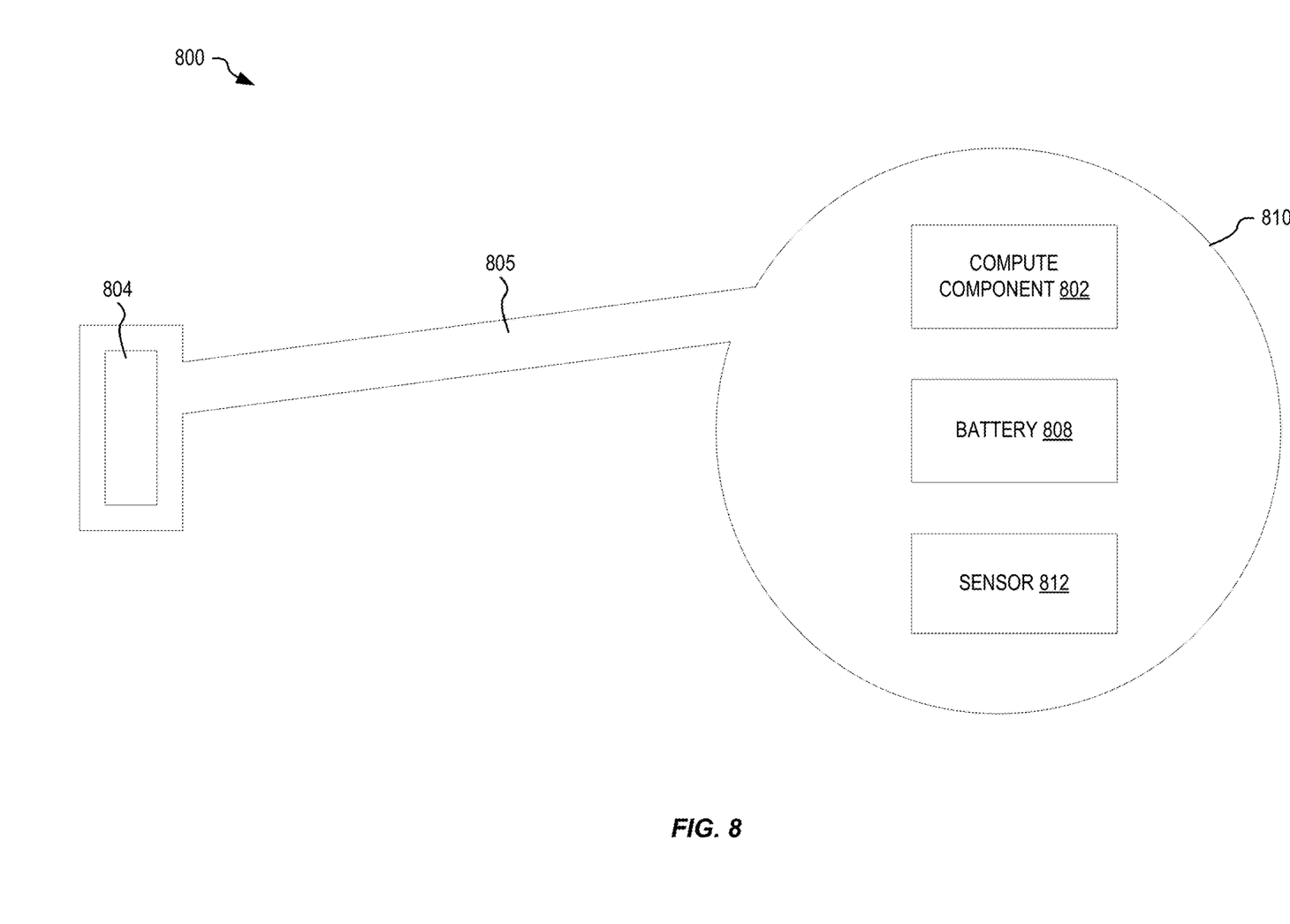
FIG. 8 is a schematic showing one example drone backpack for carrying one or more sensors, in embodiments.

FIG. 8 is a schematic showing one example drone backpack 800 for carrying one or more sensors 812. Backpack 800 is similar to drone backpacks 100, 200, and 700, and includes a display 804 positioned at a distal end of a boom 805 that couples with a housing 810 protecting a compute component 802, a battery 808, and at least one sensor 812 (e.g., environmental sensors). The one or more sensors 812 may also be positioned on and/or external to housing 810 without departing from the scope hereof. Particularly, backpack 800 provides a cost-effective solution for instrumenting a low-cost (e.g., non-specialized) drone for single-use and/or disposable operation. For example, backpack 800 may be selected from a group of backpacks with different types of sensor and/or configured with sensors 812 on demand, based on the intended use. Advantageously, weight of backpack 800 is kept to a minimum since compute component 802 sends information back to the person operating the drone via the drone's existing video feed and therefore does not require a separate transmitter and/or antenna. This further keeps the size of battery 808 to a minimum size needed to power the compute component 802 and display 804.

Continuing with the above example of sensing leaking radiation (e.g., in an area near a nuclear power station, within a building housing nuclear waste, etc.), sensor 812 may be a lightweight battery-powered Geiger counter that provides sensed levels of radiation to compute component 802, which processes and/or displays them on display 804 such that the sensed readings are visible to a camera of the carrying drone. Advantageously, drone backpack 800 allows a low cost, standard configuration drone to be easily equipped with needed sensors 812 (e.g., a Geiger counter) to provide, through the video camera and video feed of the drone, a continuous real-time readout of radiation levels. This combination of drone and Geiger counter equipped drone backpack 800 may cost less than one-thousand US dollars.

Science-Technology-Engineering-(Art)-Mathematics [STE(A)M] Kit

Figure 9:
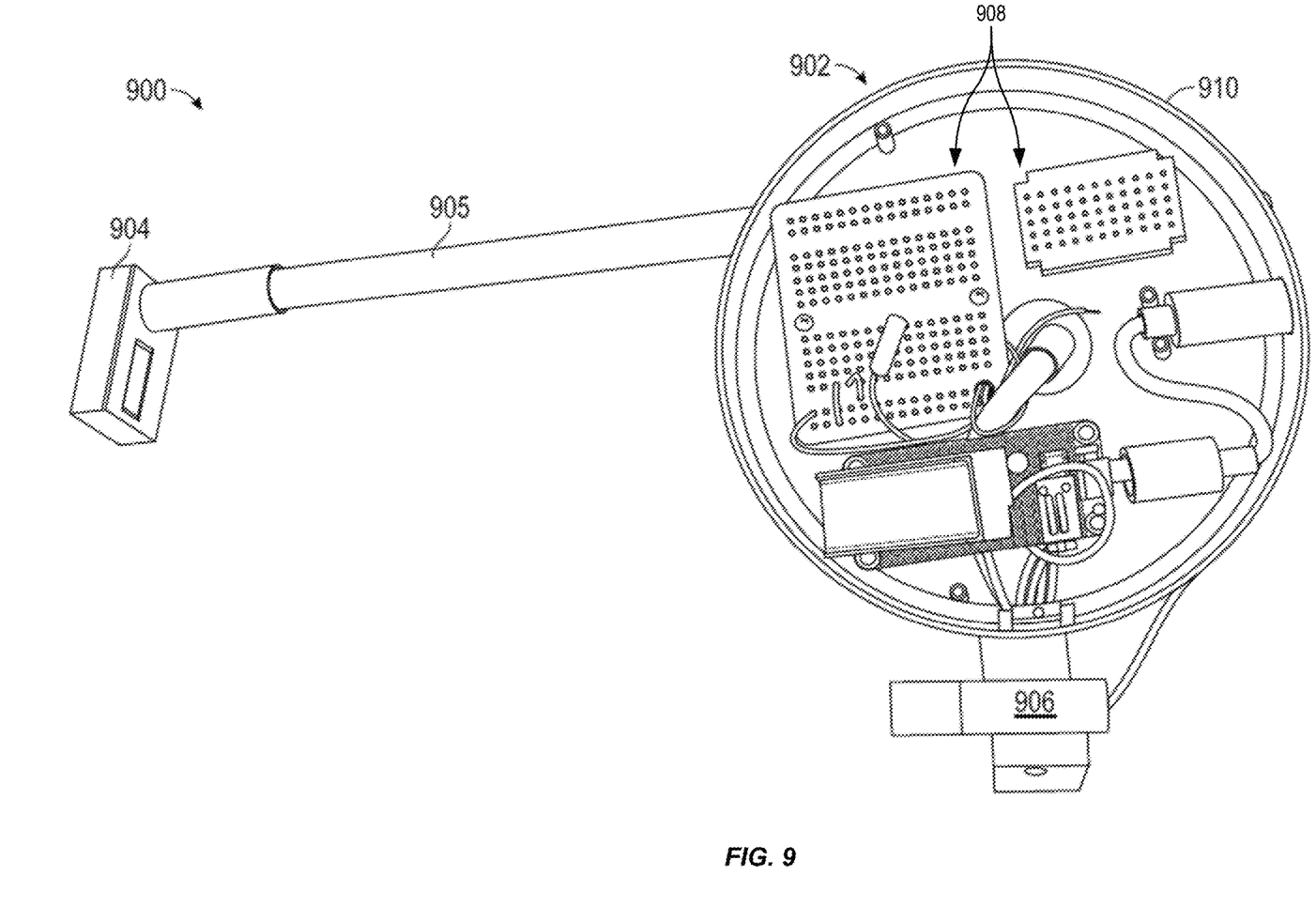
FIG. 9 is a top view of one example STE(A)M drone backpack that allows students to develop their own drone backpack projects, in embodiments.

FIG. 9 is a top view of one example STE(A)M drone backpack kit 900 that allows students to develop their own drone backpack projects. Drone backpack kit 900 is similar to drone backpacks 100, 200, 700 of FIGS. 1, 2, and 7, and includes a compute component 902 (within a housing 910), a display module 904 positioned, by a boom 905, within a FOV of a video camera of a drone when backpack kit 900 is attached thereto, an effector 906 (an implementation of effector 106). Housing 910 and boom 905 mechanically attach to a harness (not shown) that mechanically couples with a drone (not shown). A top of housing 910 is removed to show internal circuitry of compute component 902 and breadboard 908 that allow new circuitry to be easily added by students. STE(A)M drone backpack kit 900 thereby allows DIY configuration to aid innovation/tinkering for STE(A)M and maker demographics.

Although specific examples of processor boards, sensors and other components are shown in the above embodiments, the scope hereof is not limited to these specific components. For example, although certain embodiments use an AdaFruit Feather m4 processor (e.g., running CircuitPython), other processors may be used without departing from the scope hereof, for example Raspberry Pi zero, Arduino, and so on. Similarly, the display module shown is an AdaFruit 128×32 PiOLED display, however, other LED screen display with different shapes and/or sizes may be used without departing from the scope hereof.

The effector component (e.g., effector 106, FIG. 1) varies based on the use-case. For the embodiment of FIGS. 2 and 3, the IR blaster is a "Dynasty" laser tag blaster's circuitry with generic battery AAA enclosures and generic IR sensors.

Advantageously, drones 150, 250, to which the backpacks attach, remain unmodified and no difficult invasive connectivity or modification of the drone is required.

Although shown attached to a drone, these backpacks 100, 200, 700, and 800 may attach, using a harness of an appropriate shape and size, to any remote-controlled device that includes a video camera that provides a live video feed, such as a radio-controlled car.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A drone backpack for adding functionality to a drone having a forward-facing camera and controlled wirelessly from a remote controller, the drone backpack comprising:
   a housing;
   a harness that mechanically and removably couples the housing with a main body of the drone without modification to the drone;
   a display module having a screen;
   a boom coupled with the harness at a first end and coupled with the display module at a second end, the boom being aligned with the main body of the drone to position the screen within a field of view of the forward-facing camera when the harness is coupled with the drone;
   a compute component located within the housing and communicatively coupled with the display module, the compute component comprising at least one processor and memory storing machine-readable instructions that, when executed by the processor, cause the processor to control the display module to display information on the screen for capture by the forward-facing camera and inclusion in a live video feed transmitted by the drone;
   a sensor for sensing a state of a controllable light of the drone to provide a first input of the compute component;
   an effector communicatively coupled to an output of the compute component, wherein the memory further comprising machine-readable instructions that, when executed by the processor, cause the processor to activate the effector in response to the first input, the effector comprising an IR blaster that emits a beam of IR light when activated;
   a plurality of IR sensors positioned around the housing and electrically coupled to at least one second input of the compute component; and
   the compute component further comprising machine-readable instructions stored in the memory, that when executed by the processor, cause the processor to:
      compute game statistics in response to at least one of the first input and the at least one second input; and
      display the game statistics on the display module.

2. The drone backpack of claim 1, the harness being shaped and sized to mechanically couple with the main body of the drone.

3. The drone backpack of claim 1, further comprising a battery for powering the backpack independently from the drone.

4. The drone backpack of claim 1, wherein information on the display screen is sent to a remote controller of the drone via a video feed from the forward-facing camera.

5. The drone backpack of claim 1, further comprising a fiberoptic cable positioned to channel light emitted by the controllable light of the drone to the sensor.

6. The drone backpack of claim 5, the fiberoptic cable being positioned by a silicone rubber drone leg attachment.

7. The drone backpack of claim 1, the beam being aligned with the main body of the drone.

8. The drone backpack of claim 1, further comprising a target device that serves as a mobile, self-propelled object to be targeted by the drone backpack, the target device including a processor and memory storing software that, when executed by the processor, controls movement of the target device and indicates a hit when a sensor on the target device detects the IR beam.

9. The drone backpack of claim 1, further comprising a second boom coupled at a first end with the harness and having, at the second end, a friction coupling that removably couples with a tag positioned within the field-of-view of the forward-facing camera, wherein the tag comprises glue that adheres the tag to a receiving surface when pressed thereon by the drone.

10. The drone backpack of claim 9, the tag detaching from the friction coupling when adhered to the receiving surface.

11. The drone backpack of claim 9, wherein the effector comprises a UV emitter and the glue comprises a UV curing glue, the effector being activated to cure the glue.

12. A drone backpack for a drone having a forward-facing camera, comprising:
 a housing;
 a harness that mechanically couples the housing with a main body of the drone without modification of the drone;
 a display module having a screen;
 a boom coupled with the harness at a first end and coupled with the display module at a second end, the boom being aligned with the main body of the drone to position the screen within a field of view of the forward-facing camera;
 a compute component located within the housing and communicatively coupled with the display module;
 a plurality of IR sensors positioned around the housing and electrically coupled to at least one second input of the compute component;
 a sensor for sensing a state of a controllable light of the drone to provide a first input of the compute component;
 an effector, comprising an IR blaster that emits a beam of IR light when activated, communicatively coupled to an output of the compute component; and
 the compute component comprising at least one processor and memory storing machine-readable instructions that, when executed by the processor, cause the processor to:
  activate the effector in response to the first input;
  compute game statistics in response to at least one of the first input and the at least one second input; and
  control the display module to display the game statistics on the screen such that the game statistics are captured by the forward-facing camera and included in a live video feed transmitted by the drone.

* * * * *